UNITED STATES PATENT OFFICE.

HARRY B. HODGE, OF LOS ANGELES, CALIFORNIA.

LUBRICATING-OIL.

1,230,579.  Specification of Letters Patent.  Patented June 19, 1917.

No Drawing.   Application filed November 28, 1916.   Serial No. 133,967.

*To all whom it may concern:*

Be it known that I, HARRY B. HODGE, a citizen of the United States, residing at 1328 Reid street, Los Angeles, in the county of Los Angeles and State of California, have invented new and useful Improvements in Lubricating-Oils, of which the following is a specification.

My invention relates to a lubricant and especially to a lubricating oil having a fairly consistent viscosity throughout a wide range of temperature.

It is the object of this invention to treat a lubricating oil, mineral or organic, whereby the viscosity thereof is maintained at high temperatures.

It is another object of this invention to treat a lubricating oil, whereby the same will not lose its viscosity, even in cases where water is mixed therewith.

It is well known that the viscosity of the ordinary lubricating oil is reduced as its temperature rises. A lubricating oil which is satisfactory when the lubricated parts of the machine are at normal temperatures, becomes too fluid and of too little viscosity, when for any reason, the lubricated parts get hot, and for this reason the trouble of bearings and the like getting hot is aggravated.

I have discovered that with my simple treatment of the lubricating oil the viscosity thereof can be maintained throughout a great range of temperature.

For this purpose I add finely powdered slippery elm bark to the lubricating oil to be treated.

I have found that ¼ of an ounce of slippery elm bark per gallon of oil gives excellent results.

Oil treated as described is especially suitable for cylinder oil and oil bearings of all kinds. As the heat expands the oil and reduces its viscosity, the powdered slippery elm bark which has been thoroughly disseminated and mixed in the body of the oil, will expand and compensate the reduced viscosity of the oil by giving body thereto.

In cases where the steam cylinders leak, and steam or hot water is mixed with my improved oil, the slippery elm bark will absorb the water and form a lubricating emulsion consisting of water and oil, answering excellently its purpose as a lubricator.

Oil treated as described has another advantage when used as cylinder oil in internal combustion engines. At the temperature prevailing in the combustion chamber of the engine, the slippery elm bark is burnt to ashes during any carbonization of the oil, rendering the carbon deposits light and fluffy and easily swept out through the exhaust, thus keeping the cylinder and the spark plugs clean and insuring the positive functioning of the latter.

The proportion of the slippery elm bark to the oil may be increased or decreased as desired. As the proportion is increased the viscosity of the oil will be increased correspondingly.

I claim:

1. A lubricating oil consisting of oil and powdered slippery elm bark in the proportion of ¼ oz. of said bark to a gallon of oil.

2. A lubricating oil consisting of oil and powdered slippery elm bark.

In testimony whereof I have signed my name to this specification.

HARRY B. HODGE.